(12) United States Patent
Erta et al.

(10) Patent No.: US 11,678,250 B2
(45) Date of Patent: Jun. 13, 2023

(54) MOBILITY FOR WIRELESS NETWORKS WITH MULTIPATH SUPPORT

(71) Applicant: Cisco Technology, Inc., San Jose, CA (US)

(72) Inventors: Alessandro Erta, Licciana Nardi (IT); Luca Bisti, Grosseto (IT); Arun Khanna, Sunnyvale, CA (US); Sudhir Kumar Jain, Fremont, CA (US); Kasi Nalamalapu, Cupertino, CA (US); Stefano Ferrari, Le mont sur Lausanne (CH); Salvatore Valenza, Pomy (CH); Domenico Ficara, Essertines-sur-Yverdon (CH); Vincent Cuissard, Eteaux (FR); Loris Gazzarrini, Lausanne (CH); Rupak Chandra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 17/240,116

(22) Filed: Apr. 26, 2021

(65) Prior Publication Data
US 2022/0345985 A1 Oct. 27, 2022

(51) Int. Cl.
*H04W 40/00* (2009.01)
*H04W 40/24* (2009.01)
(Continued)

(52) U.S. Cl.
CPC .......... *H04W 40/246* (2013.01); *H04L 45/24* (2013.01); *H04L 45/50* (2013.01); *H04W 28/06* (2013.01); *H04W 28/10* (2013.01); *H04W 40/02* (2013.01)

(58) Field of Classification Search
None
See application file for complete search history.

(56) References Cited

U.S. PATENT DOCUMENTS

| 7,120,165 | B2 | 10/2006 | Kasvand-Harris et al. |
| 7,649,896 | B2 | 1/2010 | Yang et al. |
| (Continued) |

FOREIGN PATENT DOCUMENTS

| EP | 1521405 A1 * | 4/2005 | ......... H04L 12/5695 |
| WO | 2020181636 | 9/2020 | |

OTHER PUBLICATIONS

Miu, et al., "Multi-Radio Diversity in Wireless Networks", online: http://www2.ece.ohio-state.edu/~koksal/papers/multi_radio_diversity_journal.pdf, accessed Feb. 4, 2021, 26 pages.
(Continued)

*Primary Examiner* — Gerald A Smarth
(74) *Attorney, Agent, or Firm* — Behmke Innovation Group LLC; Kenneth J. Heywood; Jonathon P. Western (57) ABSTRACT

In one embodiment, a device identifies a plurality of access points of a wireless network. The device also identifies a plurality of mobile nodes of a mobile system. The device establishes a first label-switched path in the wireless network that comprises a wireless link between a first mobile node in the plurality of mobile nodes and a first access point in the plurality of access points. The device establishes a second label-switched path in the wireless network that comprises a wireless link between a second mobile node of the mobile system and a second access point in the plurality of access points.

20 Claims, 10 Drawing Sheets

(51) Int. Cl.
  *H04W 40/02* (2009.01)
  *H04W 28/10* (2009.01)
  *H04L 45/24* (2022.01)
  *H04W 28/06* (2009.01)
  *H04L 45/50* (2022.01)

(56) References Cited

U.S. PATENT DOCUMENTS

| | | | |
|---|---|---|---|
| 7,889,661 B2 | 2/2011 | Lee et al. | |
| 8,081,611 B2 | 12/2011 | Berzin et al. | |
| 8,355,368 B2 | 1/2013 | Lenzini et al. | |
| 9,049,153 B2* | 6/2015 | Casado | H04L 41/0853 |
| 9,769,708 B2 | 9/2017 | Bisti et al. | |
| 10,091,024 B2 | 10/2018 | Giroud et al. | |
| 2015/0215738 A1* | 7/2015 | Frusina | H04N 21/64723 |
| | | | 455/552.1 |
| 2017/0208540 A1* | 7/2017 | Egner | H04W 64/003 |
| 2019/0215385 A1* | 7/2019 | Ethier | H04L 45/123 |
| 2019/0386849 A1 | 12/2019 | Yu | |

OTHER PUBLICATIONS

Miu, et al., "Improving Loss Resilience with Multi-Radio Diversity in Wireless Networks", online: http://www2.ece.ohio-state.edu/~koksal/papers/multi_radio_diversity.pdf, accessed Feb. 4, 2021, 15 pages.

Rosen, et al., "Multiprotocol Label Switching Architecture", Network Working Group, Request for Comments 3031, Jan. 2001, 61 pages, The Internet Society.

Nadeau, et al., "Multiprotocol Label Switching (MPLS) Forwarding Equivalence Class To Next Hop Label Forwarding Entry (FEC-To-NHLFE) Management Information Base (MIB)", Network Working Group, Request for Comments 3814, 42 pages, The Internet Society.

"MPLS Solutions: Understanding The MPLS Header", online: www.gompls.net/2009/08/understanding-mpls-header.html, accessed Mar. 16, 2021, 4 pages.

British Search Report dated Sep. 7, 2022, in connection with British Patent Application No. GB2205701.2.

* cited by examiner

MOBILITY FOR WIRELESS NETWORKS WITH MULTIPATH SUPPORT

TECHNICAL FIELD

The present disclosure relates generally to computer networks, and, more particularly, to mobility for wireless networks with multipath support.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

In general, mobile wireless backhauling is challenging, particularly in cases of fast-moving mobile systems, such as trains, busses, mine carts, trucks, cranes, and the like. These vehicles have to provide connectivity to onboard wired and/or wireless devices without any interruptions. Cellular technologies, such as Long-Term Evolution (LTE), are typically not practical for such scenarios, so backhauling is performed by Wi-Fi between mobile nodes (e.g., on a train) and distributed nodes along the path (e.g., trackside nodes along the rails). However, the dynamic nature of the network, as well as the environmental radio frequency (RF) conditions, may lead to packet losses. In addition, roaming under the various Wi-Fi standards is often too slow for seamless roaming in these cases. In other words, some message exchanges in fast-moving situations may take too long to occur before the previous link breaks due to the movement of the mobile node.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device identifies a plurality of access points of a wireless network. The device also identifies a plurality of mobile nodes of a mobile system. The device establishes a first label-switched path in the wireless network that comprises a wireless link between a first mobile node in the plurality of mobile nodes and a first access point in the plurality of access points. The device establishes a second label-switched path in the wireless network that comprises a wireless link between a second mobile node of the mobile system and a second access point in the plurality of access points.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
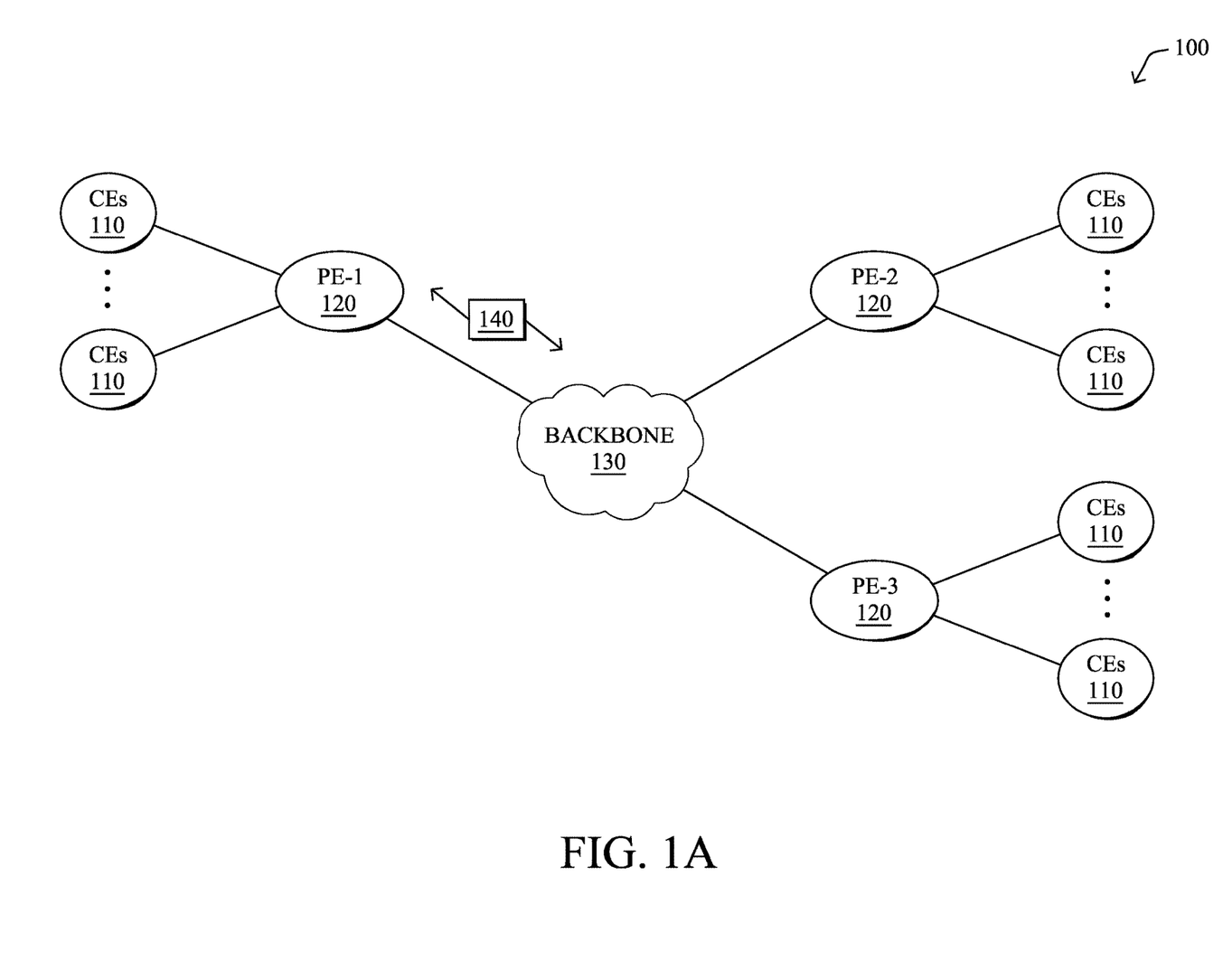
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
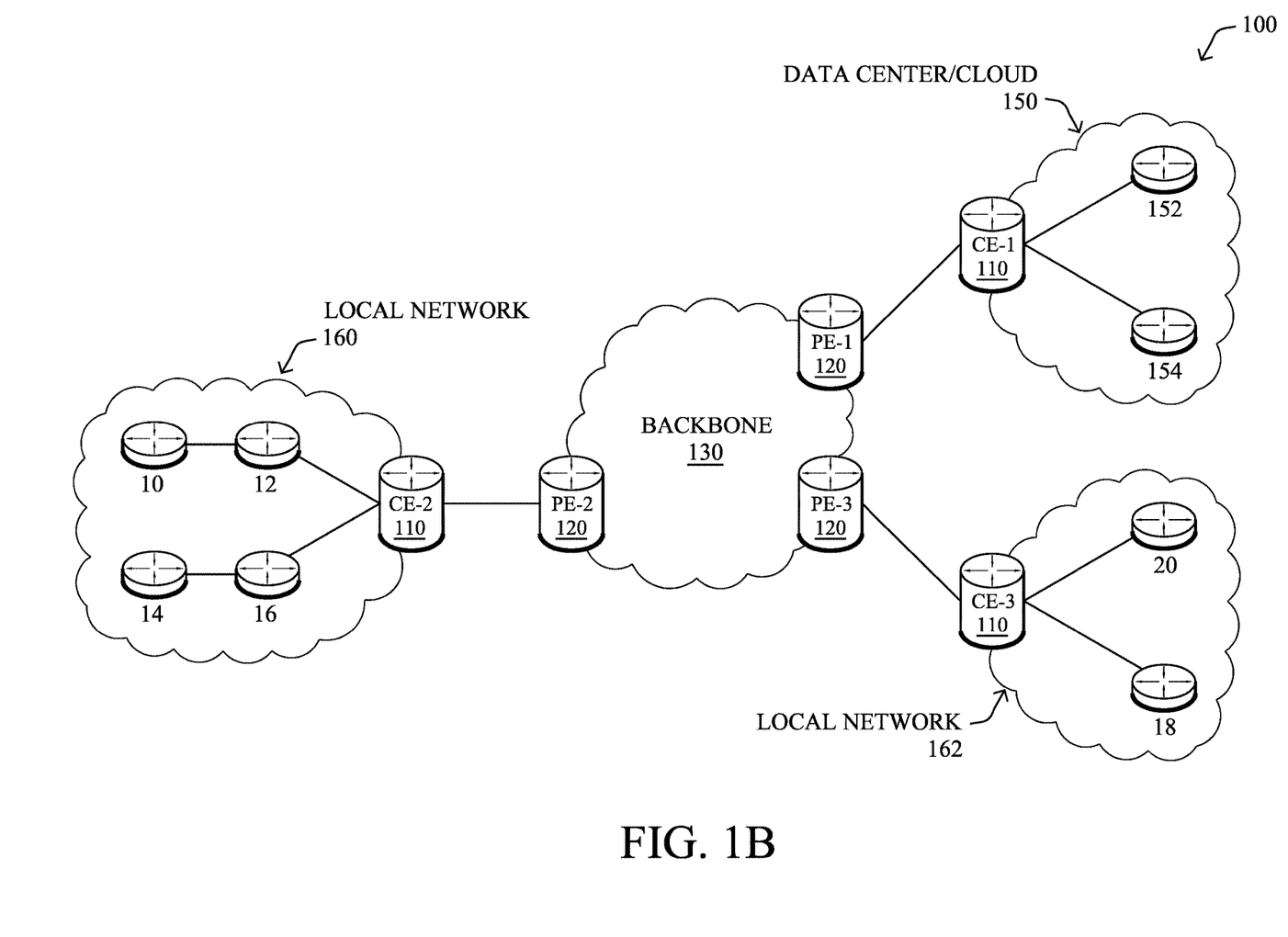

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
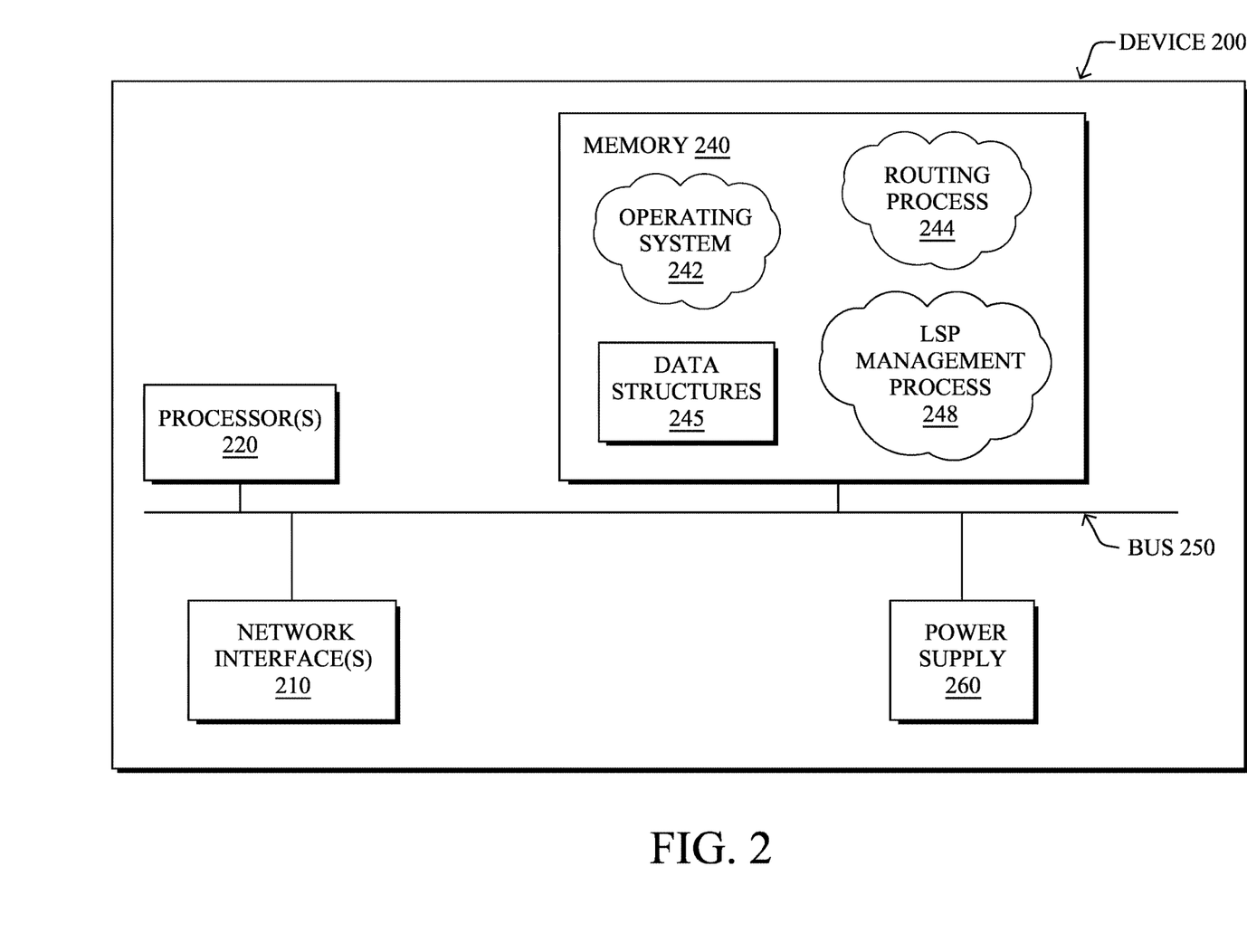
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a label-switched path (LSP) management process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, LSP management process 248 includes instructions executable by processor 220 to perform functions related to a mobile system roaming from one wireless access point to another. To this end, LSP management process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

Figure 3:
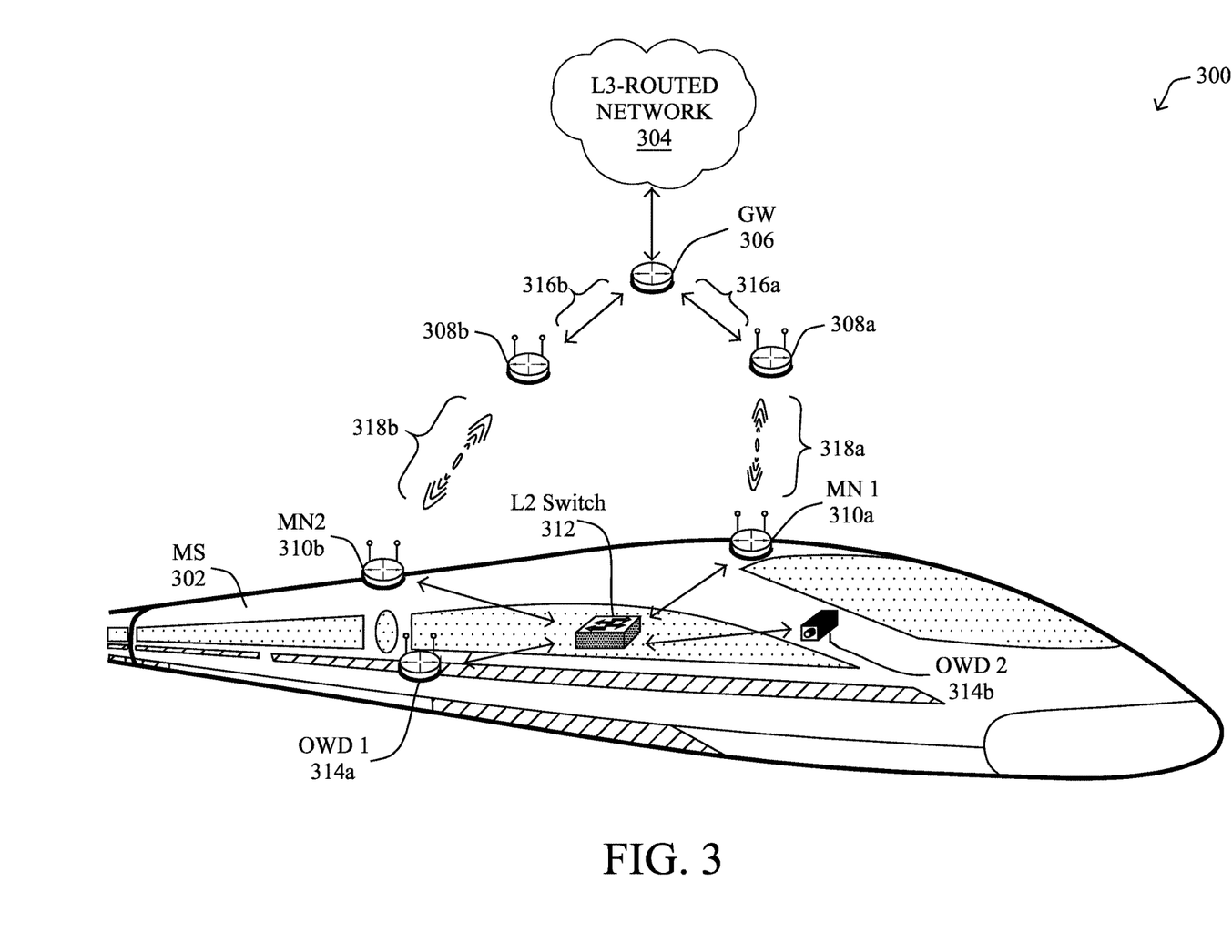
FIG. 3 illustrates an example of a mobile system communicating wirelessly.

FIG. 3 illustrates an example 300 of a mobile system communicating wirelessly, according to various embodiments. As shown, the mobile system 302, denoted "MS" in the Figures for simplicity, may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or ship, another form of vehicle that may be found in a worksite, mining location, industrial site, factory, a robot, or the like. In further cases, mobile system 302 may be a fully-autonomous, or partially-autonomous, vehicle.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314*a* may take the form of an onboard Wi-Fi access point that provides connectivity to any number of user devices (e.g., mobile phones, computers, etc.) of passengers being transported by mobile system 302. Conversely, onboard device 314*b* may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310*a* and a second MN 310*b*. Each MN 310 may generally include: 1.) a wireless interface to exchange data with wireless access points of the backhaul network and 2.) a local interface to exchange data with the local network of mobile system 302. For instance, MN 310*a* and MN 310*b* may each have a wired connection to L2 switch 312.

As would be appreciated, MN 310*a* and MN 310*b* may be located on mobile system 302 at a distance from one another, so as to provide spatial diversity to the potential wireless connection points utilized by mobile system 302. For example, MN 310*a* may be located near the front of mobile system 302 (e.g., the head-end of a train), while MN 310*b* may be located farther towards the rear of mobile system 302 than that of MN 310*a*. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points 308. For instance, as shown, there may be trackside access points (APs) 308*a*-308*b* shown. Note that while these wireless access points are referred to herein as 'trackside,' their locations can be varied depending on the deployment scenario (e.g., roadside, etc.).

During operation, APs 308*a*-308*b* may form wireless connections with MN 310*a* and/or MN 310*b*, to provide wireless connectivity to mobile system 302 as it travels. To this end, each AP 308 may include at least 1.) a wireless interface to communicate with a MN 310 and 2.) an interface to communicate with a gateway, denoted "GW" 306 in the Figures for simplicity. Typically, the connections between APs 308*a*-308*b* and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with APs 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310*a* has formed a wireless connection 318*a* with AP 308*a*. Such a connection may be formed using a suitable transmission protocol, such as the Prodigy protocol by Fluidmesh (now Cisco Systems) or another wireless protocol that supports extremely fast handoffs. Consequently, MN 310*a* may establish a first tunnel over wireless connection 318*a*. GW 306 and AP 308*a* may form a second tunnel via their connection 316*a*, likewise. Thus, when AP 308*a* sends traffic that it receives from MN 310*a* towards GW 306, it may encapsulate the traffic and tunneled via the first tunnel, which AP 308*a* then encapsulates for transport via the second tunnel to GW 306. A similar approach may be taken with respect to wireless connection 318*b* between MN 310*b* and AP 308*b*, as well as connection 316*b* between AP 308*b* and GW 306.

In alternative embodiments, a single L2 tunnel may be established between each AP 308 and GW 306. This tunnel will carry L2 traffic between GW 306 and the MN 310 to which the AP 308 is connected. For instance, a first L2 tunnel may be formed between GW 306 and AP 308*a* over which traffic conveyed between AP 308*a* and MN 310*a* may be transported, assuming that wireless connection 318*a* exists. Similarly, another GW 306 and AP 308*b* may form a second L2 tunnel over which traffic conveyed between AP 308*b* and MN 310*b* may be transported, assuming that wireless connection 318*a* exists.

Traditionally, only a single wireless link is active at any given time between a mobile system, such as MS 302, and any given AP 308. For instance, assume that MN 310*a* is wirelessly connected to AP 308*a*. In such a case, any other MN 310 on MS 302 (e.g., MN 310*b*, etc.) may be in an idle state at that time. In other words, one of the mobile nodes (e.g., MN 310*a*) may be designated as the primary, while the other is designated as the secondary (e.g., MN 310*b*) and remains idle. As MS 302 roams, the primary node may begin passing its traffic to the secondary node, to begin leveraging its own connection to the fixed infrastructure. In turn, the roles of the two nodes may be switched, thereby making MN 310*a* the secondary node and MN 310*b* the primary node.

Mobility for Wireless Networks with Multipath Support

The techniques herein introduce an approach to establish multiple label-switched paths (LSPs) between a mobile system and the backend infrastructure of a wireless network. By establishing multiple LSPs between the infrastructure and the mobile system, this enables high-priority packets to be sent via redundant paths, helping to guard against conditions such as packet loss. In addition, by establishing multiple LSPs, seamless handoffs can also be supported.

Illustratively, the techniques described herein may be performed by hardware, software, and/or firmware, such as in accordance with the LSP management process 248, which may include computer executable instructions executed by the processor 220 (or independent processor of interfaces 210) to perform functions relating to the techniques described herein, potentially in conjunction with routing process 244.

Specifically, according to various embodiments, a device identifies a plurality of access points of a wireless network. The device also identifies a plurality of mobile nodes of a mobile system. The device establishes a first label-switched path in the wireless network that comprises a wireless link between a first mobile node in the plurality of mobile nodes and a first access point in the plurality of access points. The device establishes a second label-switched path in the wireless network that comprises a wireless link between a second mobile node of the mobile system and a second access point in the plurality of access points.

Figure 4:
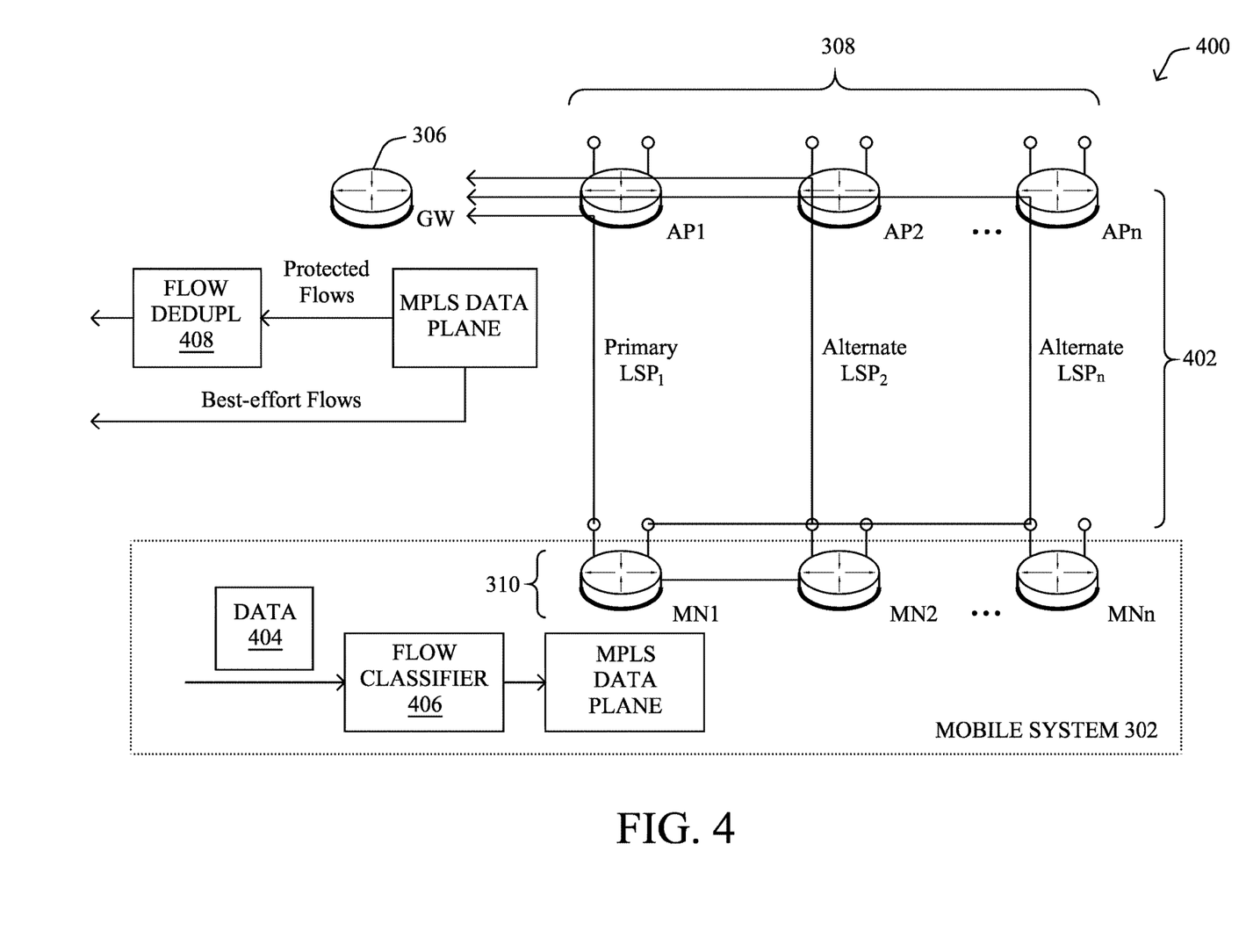
FIG. 4 illustrates an example of the establishment of multiple label-switched paths (LSPs) in a wireless network.

Operationally, FIG. 4 illustrates an example 400 of a mobile system communicating wirelessly with a backhauling system employing Layer-2 tunnels, according to various embodiments. Continuing the example of FIG. 3, again assume that there is a mobile system 302 that is to communicate wirelessly with a backhauling system comprising a plurality of APs 308 and a GW 306 that provides connectivity to an L3-routed network.

According to various embodiments, the techniques herein propose extending multiple LSPs 402 between n-number of MNs 310 located onboard mobile system 302 that extend via wireless links with up to an equal number of APs 308. In some embodiments, one of the LSPs 402, designated $LSP_1$, may be designated as a primary LSP that includes a wireless link between a primary MN 310, $M_i$, to a primary AP 308, $AP_1$. In addition, n-1 number of additional LSPs 402 may also extend via wireless links between $MN_2$-$MN_n$ and $AP_2$-$AP_n$. In doing so, there may be multiple paths available between mobile system 302 and GW 306 at any given time. This can also add spatial and/or frequency diversity to the paths, helping to ensure packet delivery.

As would be appreciated, by establishing multiple LSPs between a mobile system and the wireless infrastructure, this enables multiple use cases such as, but not limited to, any or all of the following:

Sending redundant packets along diverse paths, to help improve reliability in the face of packet losses.
Load balancing traffic across the multiple paths that are available.
Etc.

Assume, for example, that data packet 404 is sent by an endpoint device aboard mobile system 302. In some embodiments, data packet 404 may be passed to a flow classifier 406 that classifies data packet 404 by its type (e.g., its associated application). This classification allows an FEC to be applied and $MN_1$ will add the appropriate labels to data packet 404 and send it via at least primary $LSP_1$. If data packet 404 is deemed by flow classifier 406 to be of high importance, $MN_1$ may also send redundant packet copies via any or all of $LSP_2$-$LSP_n$ to GW 306. In turn, GW 306 may employ its own packet de-duplicator 408 that deduplicates the packets by dropping any redundant packets that it receives. Conversely, if the priority of data packet 404 is lower priority, it may be sent on a best-effort basis via only $LSP_1$.

In further embodiments, while it is envisioned that different MNs 310 may be used for purposes of sending the traffic over multiple paths/LSPs 402, directly, an alternative approach would be to leverage Orthogonal Frequency Division Multiple Access (OFDMA) to replicate the traffic. In this case, a single MN 310 may send the duplicate packets to multiple APs.

Figure 5A:
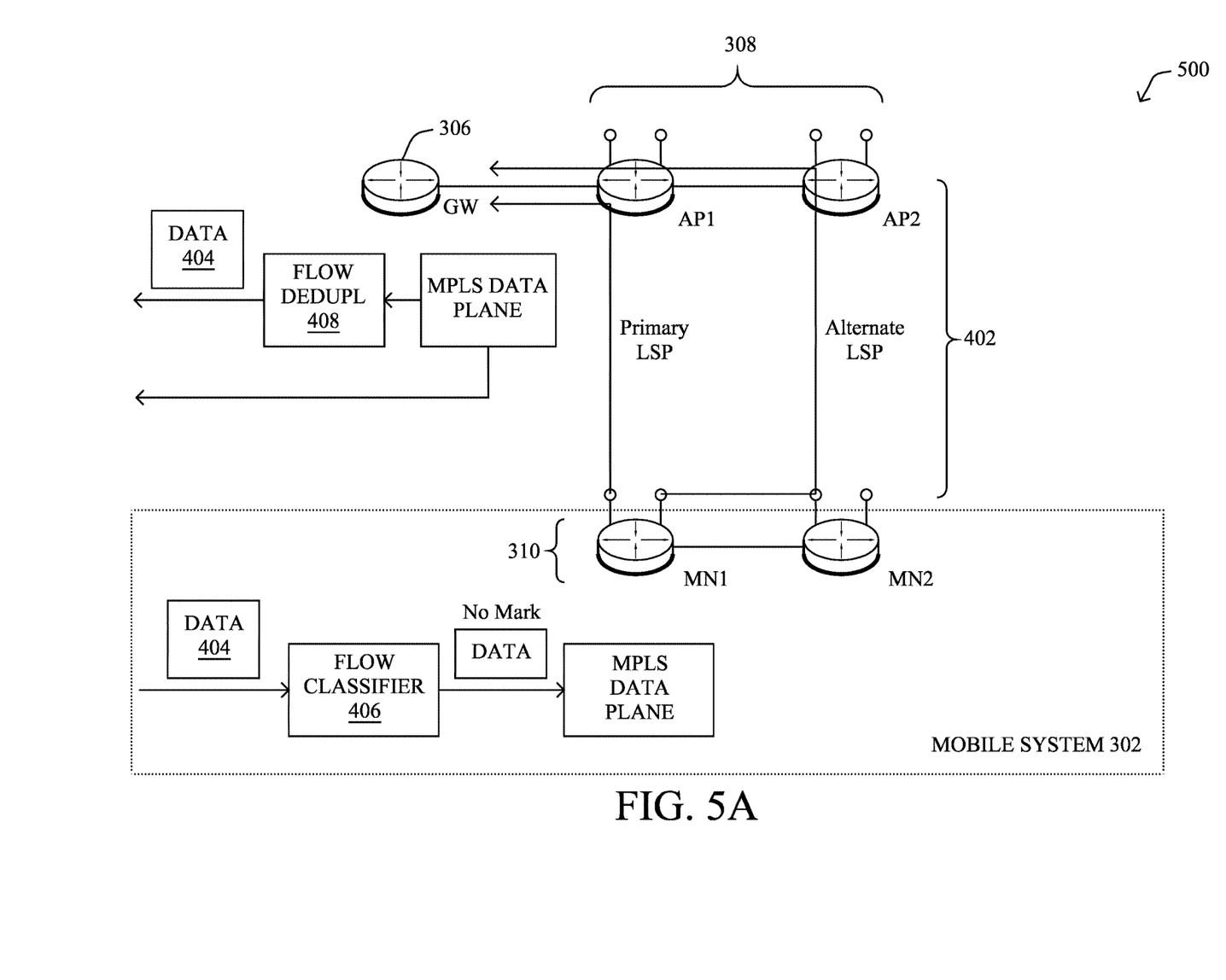
FIGS. 5A-5B illustrate examples of packets being sent in a wireless network.
Figure 5B:
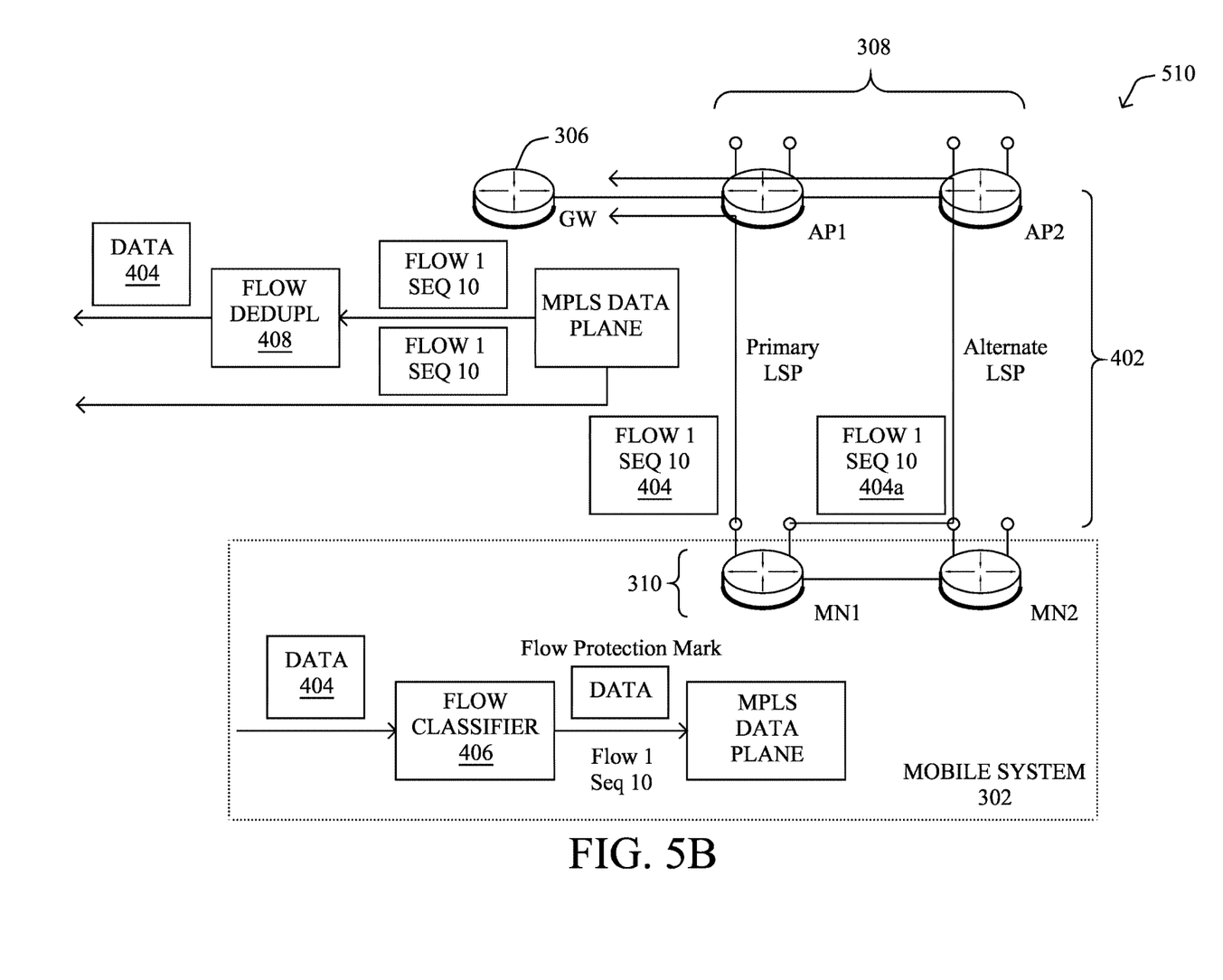

FIGS. 5A-5B illustrate examples of packets being sent in a wireless network, according to various embodiments. In example 500, assume again that there is a mobile system 302 that comprises MNs 310 and wireless network infrastructure that includes APs 308 and a GW 306. For simplicity, only two MNs 310, $MN_1$-$MN_2$, and two APs 308, $AP_1$-AP2 are shown. However, the packet duplication techniques described herein could be used to duplicate packets along any number of alternate LSPs 402, as desired.

When flow classifier 406 determines that data packet 404 is not critical traffic and, thus, should not be protected using redundancy, it may simply leave data packet 404 unmarked. Doing so may signify to $MN_1$ that a best-effort approach can be taken. In turn, $MN_1$ may add an appropriate label stack to data packet 404 to send data packet 404 only via the primary LSP 402 that traverses the wireless link between $MN_1$ and $AP_1$.

FIG. 5B shows another example 510 in which flow classifier 406 determines that data packet 404 is considered critical and should be protected during transmission. In such a case, flow classifier 406 may mark data packet 404 with a flow protection mark. This allows $MN_1$ to add the appropriate header to data packet 404 for transmission via the primary LSP 402. In addition, $MN_1$ may also duplicate data packet 404 and send the resulting duplicate packet 404a via $MN_2$ and the alternate LSP 402 towards GW 306. Thus, if data packet 404 is lost during transmission over the primary LSP 402, the infrastructure may still receive a copy of it in the form of the duplicate data packet 404a.

In various embodiments, $MN_1$ may also insert a flow identifier and sequence number into data packet 404 and the duplicate data packet 404a. This allows flow de-duplicator 408 at GW 306 to identify situations in which it receives both of data packet 404 and duplicate data packet 404a, by comparing their flow identifiers and sequence numbers. If the two match, flow de-duplicator 408 may opt to drop one of the two, thereby only sending on a single copy of data packet 404.

As would be appreciated, the packet duplication mechanism shown can also be bi-directional in nature. In other words, while mobile system 302 is shown as having a flow classifier 406 and GW 306 comprising a flow de-duplicator 408, further embodiments provide for duplication to be implemented in the opposite direction, as well. This can be achieved by GW 306 also including a flow classifier 406 that classifies any incoming packets that are destined for mobile system 302 and mobile system 302 including a flow de-duplicator 408 that drops any duplicated packets received by mobile system 302 via diverse LSPs 402.

Figure 6A:
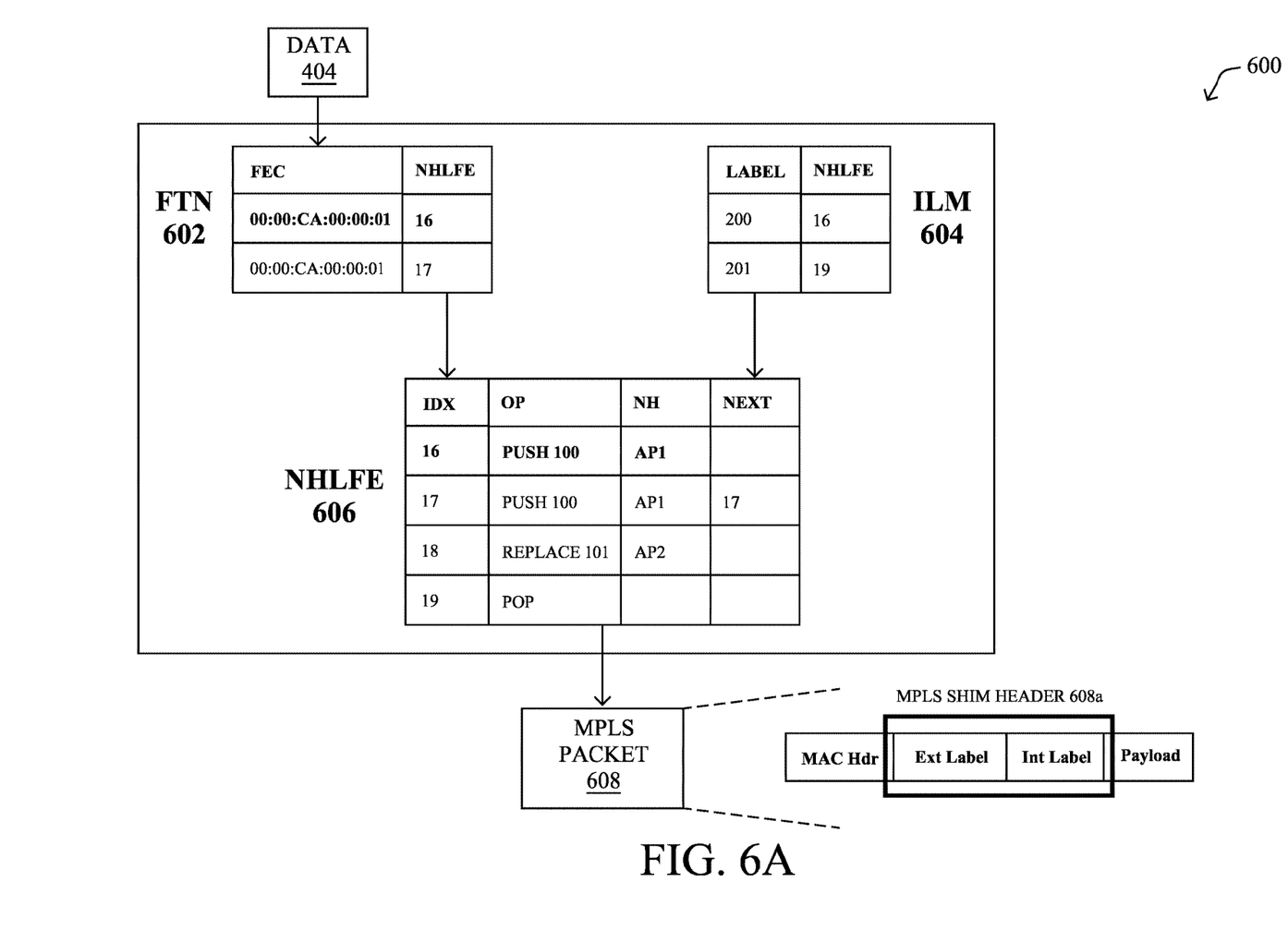
FIGS. 6A-6B illustrate examples of forwarding tables used to forward a packet.
Figure 6B:
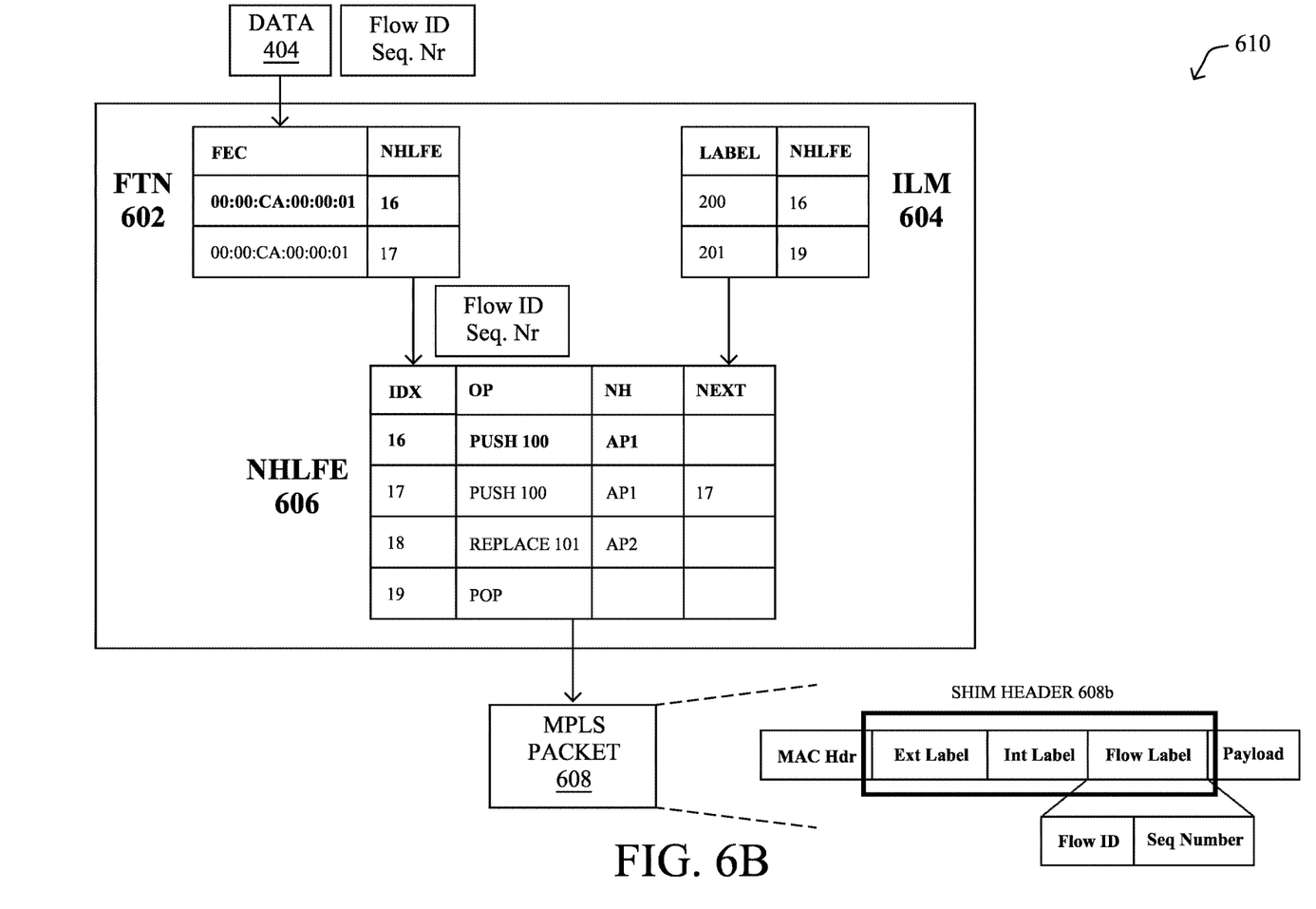

FIGS. 6A-6B illustrate examples of forwarding tables used to forward data packet 404, according to various embodiments. More specifically, FIG. 6A illustrates an example 600 of the operations to support the sending of data packet 404 when data packet 404 is not considered to be critical traffic that requires duplication. As shown, when LSPs 402 are created, corresponding entries may be generated for any or all of the following tables:

Next Hop Label Forwarding Entry (NHLFE) table 606 that stores indexed entries that specify the label operations and next hop information to be included in the label-switched header to be appended to data packet 404.

Incoming Label Map (ILM) table 604 that maps labels to entries in NHLFE table 606.

FEC to NHLFE (FTN) table 602 that maps FEC classes to NHLFE entries.

In the case in which data packet 404 is not critical, its corresponding FEC class in FTN table 602 may lead to it being encapsulated as an MPLS packet 608 with a shim header 608a that includes a label that routes the packet via the primary LSP via AP1.

FIG. 6B illustrates another example 610, this time showing the processing of data packet 404 when data packet 404 is deemed critical. In such a case, data packet 404 may be tagged with a flow identifier and sequence number. In turn, this information may be included in the resulting MPLS packet 608 within its shim header 608b, such as part of a flow label. This information can then be used at the receiver side, to eliminate any duplicate packets that it receives.

As shown, a key feature of the entries in NHLFE table 606 is its built-in support for packet duplication (e.g., the entries with IDs 17-18) as part of the data plane. More specifically, in cases in which data packet 404 is critical, copies of data packet 404 may be sent via the primary LSP that traverses AP1, as well as via the alternate LSP that traverses AP2.

In some embodiments, as a natural extension to the above techniques, the path of each LSP (primary or redundant) can be updated independently from the others by doing a specific handoff at any time, according to the varying signal quality received from the APs. Every update may be seamless, in the sense that they follow the usual make-before-break approach, to avoid traffic disruption. To avoid duplicating traffic over bad links, which could be detrimental to the overall performance of the system, redundant LSPs may also be temporarily ignored or even deleted, if the available wireless signals do not support any of them anymore, at some point in time. The signaling message to delete the redundant LSP would be sent over the primary path, which is always present.

Note that the above mechanisms are exemplary only and can be adapted for other purposes as well. Indeed, once multiple LSPs have been established between the mobile system and the infrastructure, these LSPs can be used for any number of other purposes, as desired. For instance, the above mechanisms could also be modified for purposes of load balancing traffic across the different LSPs, selecting a particular LSP for a particular type of traffic, or the like.

Figure 7:
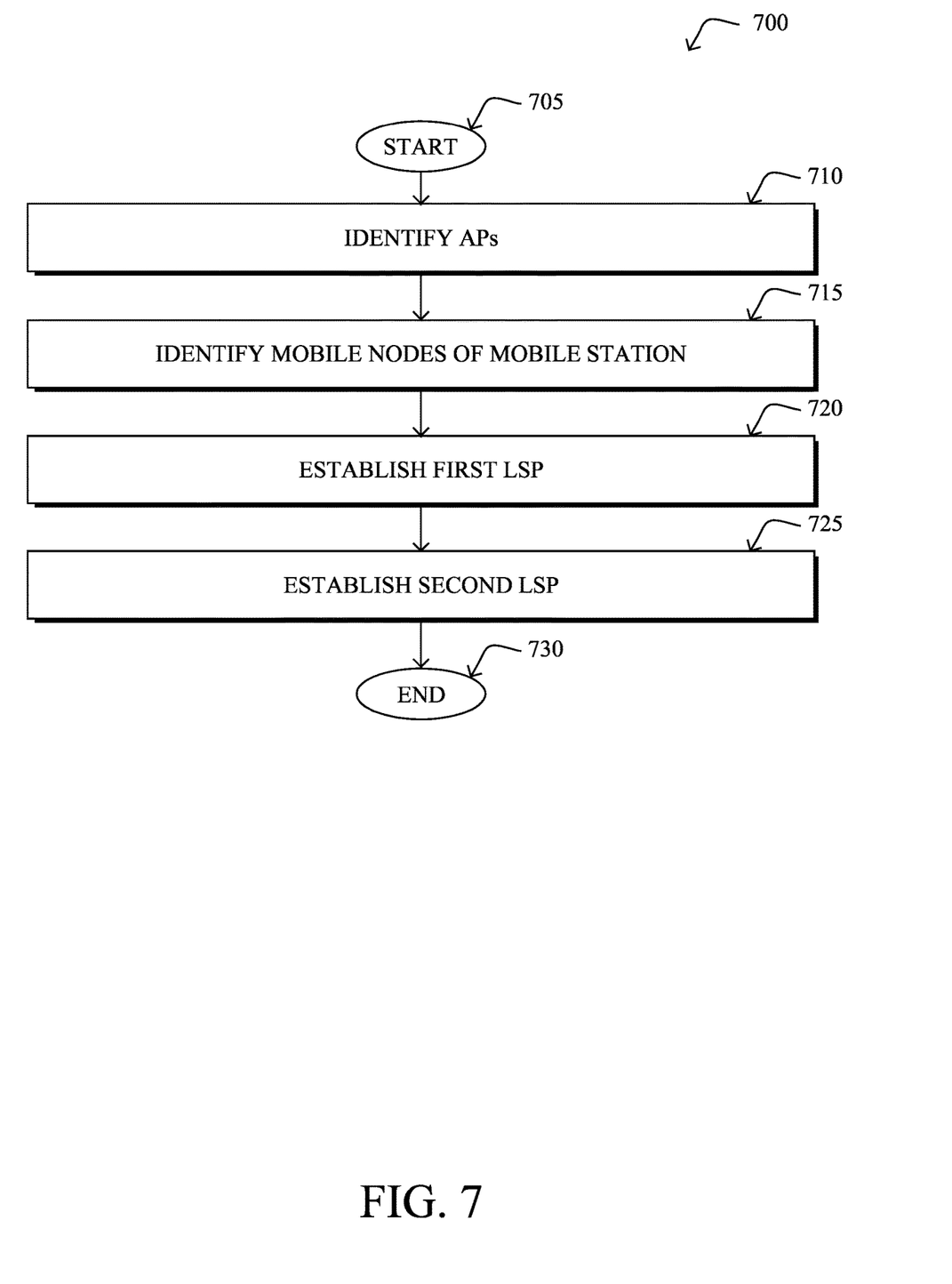
FIG. 7 illustrates an example simplified procedure for establishing multiple LSPs with a mobile system.

FIG. 7 illustrates an example simplified procedure for providing connectivity to a mobile system, in accordance with one or more embodiments described herein. For example, a non-generic, specifically configured device/apparatus (e.g., device 200), such as a gateway, access point, mobile node of a mobile system, or another device in communication therewith, may perform procedure 700 by executing stored instructions (e.g., routing process 244 and/or LSP management process 248). The procedure 700 may start at step 705, and continues to step 710, where, as described in greater detail above, the device may identify a plurality of access points of the wireless network. For instance, such access points may be located along a path of travel of a mobile system (e.g., a train, other vehicle, robot, etc.).

At step 715, as detailed above, the device may also identify a plurality of mobile nodes of a mobile system. In general, such mobile nodes may include at least one wireless interface and at least one local interface to communicate with the local network of the mobile system. For instance, the mobile nodes may take the form of wireless routers or other networking equipment that are in communication with one another and may form wireless links with any of the access points of the network, as the mobile system travels.

At step 720, the device may establish a first label-switched path (LSP) in the wireless network that comprises a wireless link between a first mobile node in the plurality of mobile nodes and a first access point in the plurality of access point. For instance, the device may cause the first mobile node, first access point, or a combination thereof to initiate the requisite signaling to establish a first LSP that traverses the link between the two. In addition, the device may also cause entries to be generated in the relevant forwarding tables, so that packets can be sent via the LSP. In general, the LSP may be used to convey packets between a gateway of the wireless network and the mobile system, as the mobile system is in motion.

At step 725, as detailed above, the device may also establish a second LSP in the wireless network that comprises a wireless link between a second mobile node of the mobile system and a second access point. Thus, there will be at least two LSPs between the mobile system and the infrastructure of the wireless network. Of course, further LSPs may also be established (e.g., a third LSP, a fourth LSP, etc.), depending on the number of mobile nodes on the mobile system and the number of access points that are within communication range of them. In some embodiments, the first mobile node may be connected to the second mobile node and receive a packet from the second mobile node that was sent via the second LSP. In further embodiments, the two or more LSPs may be used to provide redundancy between the infrastructure and the mobile system. To do so, this can be achieved by generating an NHLFE table entry that is associated with the first LSP and causes a duplicate of a packet to be sent via the second LSP. In such cases, a sequence number and flow identifier may be added to the packets, so as to allow a receiver to remove any duplicate packets that it receives. In yet another embodiment, different FECs could be used to control this duplication, thereby allowing redundant packets to be sent only for high-priority forms of traffic (e.g., traffic associated with certain types of applications). Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a mechanism for establishing multiple LSPs between a mobile system and wireless infrastructure that provides external connectivity to the mobile system. In particular, the techniques introduced herein can be leveraged to provide redundancy to certain packets, thereby helping to ensure packet delivery, as well as supporting a smooth handoff as the mobile system moves out of range of one access point and closer to another access point. More specifically, in mission-critical applications such as real-time industrial control systems, critical flows can be protected by N-path redundancy from wireless packet loss or excessive delay/jitter spikes caused, for example, by transient line of sight (LOS) obstructions, interference, or fading affecting one mobile wireless link but not others.

While there have been shown and described illustrative embodiments that provide for mobility in a wireless network with multipath support, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
identifying, by a device, a plurality of access points of a wireless network;
identifying, by the device, a plurality of mobile nodes of a mobile system;
establishing, by the device, a first label-switched path in the wireless network that comprises a wireless link between a first mobile node in the plurality of mobile nodes and a first access point in the plurality of access points; and
establishing, by the device, a second label-switched path in the wireless network that comprises a wireless link between a second mobile node of the mobile system and a second access point in the plurality of access points.

2. The method as in claim 1, wherein the first label-switched path and the second label-switched path are used to convey packets between a gateway of the wireless network and the mobile system.

3. The method as in claim 1, wherein the first mobile node is connected to the second mobile node and receives a packet from the second mobile node that was sent via the second label-switched path.

4. The method as in claim 1, further comprising:
establishing one or more additional label-switched paths in the wireless network that comprise one or more wireless links between one or more additional mobile nodes of the mobile system and one or more additional access points in the plurality of access points.

5. The method as in claim 1, further comprising:
generating a table entry for a Next Hop Label Forwarding Entry (NHLFE) table associated with the first label-switched path that causes a duplicate of a packet sent via the first label-switched path to be sent via the second label-switched path.

6. The method as in claim 5, wherein the packet and the duplicate of the packet include shim headers that indicate a flow identifier and sequence number.

7. The method as in claim 6, wherein the flow identifier and sequence number are used to deduplicate the duplicate of the packet, when both the duplicate of the packet and the packet are received at a destination.

8. The method as in claim 5, wherein the table entry is associated with a forwarding equivalency class, and wherein the packet is classified as being of that forwarding equivalency class, prior to sending the packet via the first label-switched path.

9. The method as in claim 1, wherein the mobile system comprises a vehicle or robot.

10. The method as in claim 1, wherein first label-switched path and the second label-switched path are Multiprotocol Label Switching (MPLS) paths.

11. An apparatus, comprising:
one or more network interfaces;
a processor coupled to the one or more network interfaces and configured to execute one or more processes; and
a memory configured to store a process that is executable by the processor, the process when executed configured to:
identify a plurality of access points of a wireless network;
identify a plurality of mobile nodes of a mobile system;
establish a first label-switched path in the wireless network that comprises a wireless link between a first mobile node in the plurality of mobile nodes and a first access point in the plurality of access points; and
establish a second label-switched path in the wireless network that comprises a wireless link between a second mobile node of the mobile system and a second access point in the plurality of access points.

12. The apparatus as in claim 11, wherein the first label-switched path and the second label-switched path are used to convey packets between a gateway of the wireless network and the mobile system.

13. The apparatus as in claim 11, wherein the first mobile node is connected to the second mobile node and receives a packet from the second mobile node that was sent via the second label-switched path.

14. The apparatus as in claim 11, wherein the process when executed is further configured to:
establish one or more additional label-switched paths in the wireless network that comprise one or more wireless links between one or more additional mobile nodes of the mobile system and one or more additional access points in the plurality of access points.

15. The apparatus as in claim 11, wherein the process when executed is further configured to:
generating a table entry for a Next Hop Label Forwarding Entry table that is associated with the first label-switched path that causes a duplicate of a packet sent via the first label-switched path to be sent via the second label-switched path.

16. The apparatus as in claim 15, wherein the packet and the duplicate of the packet include shim headers that indicate a flow identifier and sequence number.

17. The apparatus as in claim 16, wherein the flow identifier and sequence number are used to deduplicate the duplicate of the packet, when both the duplicate of the packet and the packet are received at a destination.

18. The apparatus as in claim 15, wherein the table entry is associated with a forwarding equivalency class, and wherein the packet is classified as being of that forwarding equivalency class, prior to sending the packet via the first label-switched path.

19. The apparatus as in claim 11, wherein the mobile system comprises a vehicle or robot.

20. A tangible, non-transitory, computer-readable medium storing program instructions that cause a device to execute a process comprising:
identifying, by a device, a plurality of access points of a wireless network;
identifying, by the device, a plurality of mobile nodes of a mobile system;
establishing, by the device, a first label-switched path in the wireless network that comprises a wireless link between a first mobile node in the plurality of mobile nodes and a first access point in the plurality of access points; and
establishing, by the device, a second label-switched path in the wireless network that comprises a wireless link between a second mobile node of the mobile system and a second access point in the plurality of access points.

* * * * *

UNITED STATES PATENT AND TRADEMARK OFFICE
CERTIFICATE OF CORRECTION

PATENT NO. : 11,678,250 B2
APPLICATION NO. : 17/240116
DATED : June 13, 2023
INVENTOR(S) : Alessandro Erta et al.

It is certified that error appears in the above-identified patent and that said Letters Patent is hereby corrected as shown below:

In the Specification

Column 8, Line 30, please amend as shown:
link between a primary MN 310, $M_1$, to a primary AP 308, In the Claims Column 12, Line 35, please amend as shown:
    points,
        wherein the first label-switched path between the first mobile node and the first access point and the second label-switched path between the second mobile node and the second access point are active at the same time.

Column 13, Line 24, please amend as shown:
    a second access point in the plurality of access points,
        wherein the first label-switched path between the first mobile node and the first access point and the second label-switched path between the second mobile node and the second access point are active at the same time.

Column 14, Line 38, please amend as shown:
    points,
    wherein the first label-switched path between the first mobile node and the first access point and the second label-switched path between the second mobile node and the second access point are active at the same time.

Signed and Sealed this
Nineteenth Day of September, 2023

*Katherine Kelly Vidal*
Katherine Kelly Vidal
*Director of the United States Patent and Trademark Office*